Jan. 31, 1961  A. GRUNBERG  2,969,877
APPARATUS FOR CLASSIFYING PARTICULATE SOLID MATERIAL
Filed June 16, 1958
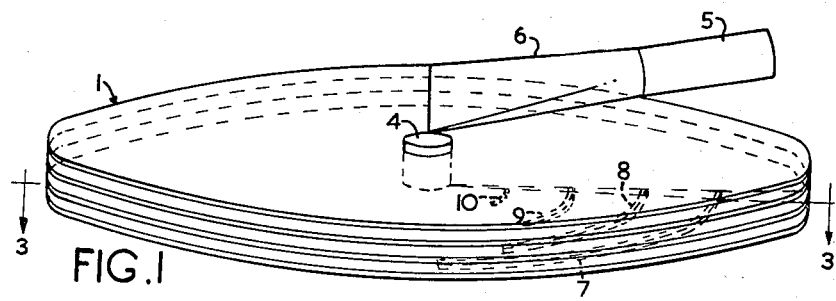
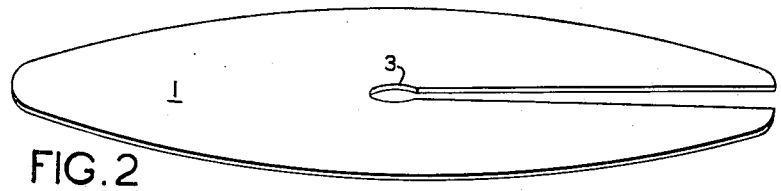
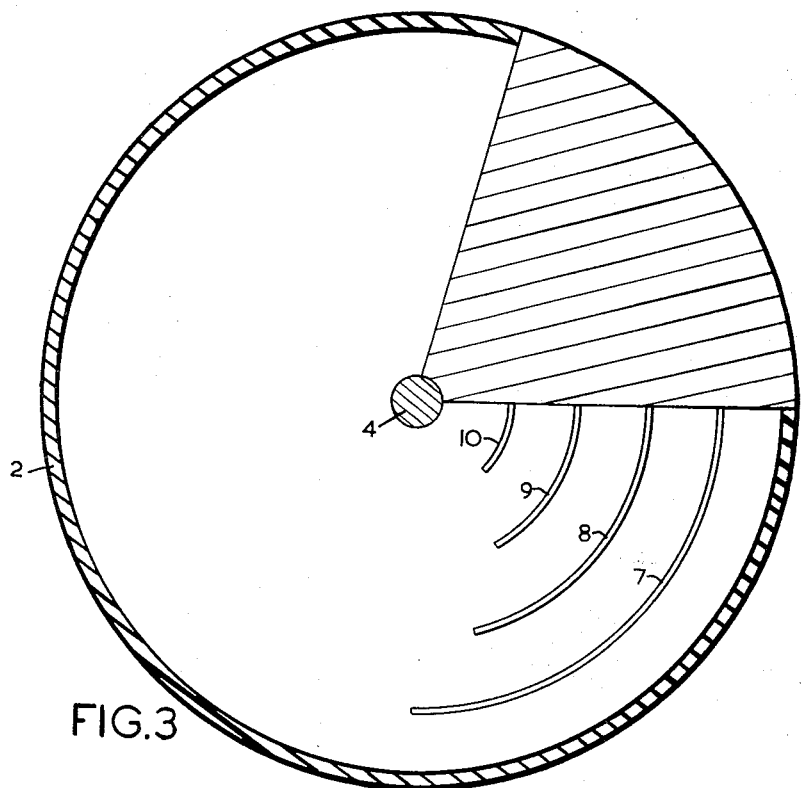
Andrew GRUNBERG
INVENTOR
By: Wenderoth, Lind & Ponack
Attys 2,969,877
Patented Jan. 31, 1961

2,969,877
APPARATUS FOR CLASSIFYING PARTICULATE SOLID MATERIAL

Andrew Grunberg, Deakin, Canberra, Australia (2 Minna St., Burwood, New South Wales, Australia)

Filed June 16, 1958, Ser. No. 742,190

Claims priority, application Australia June 28, 1957

2 Claims. (Cl. 209—144)

This invention relates to the separation and classification of particulate solid material in a fluid medium.

Various methods exist for separating particulate solids, such as mineral-containing sands, into selected fractions determined by the grainsize or mass of a required group. In general, such methods may be regarded as types of sedimentation from a fluid. A widely employed mode of separation of a required particulate solid material from an aggregate including unwanted materials involves the use of a vortex created in a fluid by imparting a high rotational velocity thereto and selective removal of particulate material suspended in such fluid from zones occupied by particles of like physical characteristics, including mass, density or particle size. The employment of vortices has a disadvantage in that only a relatively narrow range of particles can be isolated from a heterogeneous aggregate in one operation. Accordingly, progressive treatment over a series of separating units becomes necessary to separate a number of classes of, say, alluvial sand components from the source material.

The primary object of the present invention is to provide a method and apparatus whereby a wide category of particles may be subdivided into predetermined classes of like mass or particle size, rapidly and economically.

A further object of the invention is to provide apparatus of relatively simple construction, adapted to be operated by unskilled labour.

Other objects and advantages will be apparent from the following description.

The method of separating and classifying fractions of particulate solid aggregate in accordance with the invention comprises causing the solid aggregate to flow together with a fluid along a confined and guided helical path, whereby the particles become spread transversely of the helical path in order of mass or size under the combined influence of centrifugal and cycloidal forces resulting from the helical path which the fluid is constrained to follow and separately collecting the outflowing material from predetermined cross-sectional areas of the helical path. Preferably, the axis of the helix is substantially vertical, and the flow may either be upward or downward.

It is to be understood that gases or liquids may be employed as the carrying fluid and that improved discrimination between, for example, mineral species in a mineral aggregate may involve selection of a fluid of suitable viscosity and/or density.

The apparatus for carrying out the method of the invention comprises a helical launder suitably supported and connected at one or more transversely disposed areas of the launder to a source of fluid containing unsorted particulate solids which flow through the helical launder and are tapped off from outlets provided at predetermined transversely disposed areas of the launder.

The precise width and depth of the helical path, its pitch and number of turns may be varied in accordance with requirements including quantity of fluid and solid mixture, and the velocity at which the same is passed through the launder. The capacity for selective tapping of desired fractions of material is enhanced by increasing the width of the helical path, and consequently, providing a greater range of velocity between the axial and circumferential zones of the helical launder. By selecting a suitable width of the helical path and causing the material to flow either under a relatively high velocity or under a relatively low velocity, the apparatus may be used to remove excess fluid from the solid material. If the velocity is relatively high the solids may be tapped off from the circumferential zone. Of the velocity is relatively low the solids may be tapped off from the axial zone.

The apparatus may take many constructional forms, but it may consist of a helically wound tube of flattened cross-section, and each superposed turn of the tube may be formed integral with the turn above and below.

The invention will be more fully understood from the following description with reference to the accompanying drawings in which:

Fig. 1 is a perspective elevation of one form of helical launder in accordance with the invention.

Fig. 2 is a perspective elevation of one of the plates from which the launder of Fig. 1 is fabricated.

Fig. 3 is a plan view in section taken along the line 3—3 in Fig. 1.

The apparatus illustrated consisted of 3¾ turns of tubing of flattened cross-section formed integrally from a plurality of metal plates 1. Each plate 1 has a radial cut extending from a hollow centre 3 to the circumference and the respective cut edges are splayed in opposite directions so that they may be joined as by welding to the cut edges of the next adjacent plate. Each plate is spaced apart from the next adjacent plate by a circumferential strip of rubber or like material. A plug 4 may be inserted into the core formed by the hollow centres 3 of the metal plates 1.

The core was of 2½ inches diameter, the distance between core and circumference was 2 feet and the depth between each plate was ¾ inch.

The space between the splayed edges of the top plate constitutes the entrance to the apparatus to which an extension piece 6 is secured, the extension piece being threaded at the outer end to receive an outlet pipe 5 from a pump (not shown).

The extension piece 6 is preferably baffled internally so that the solid-fluid mixture enters only the circumferential zone. Moreover the two uppermost plates may be of greater diameter than the others so that the inlet through piece 6 is entirely tangential to the circumference of the apparatus.

The fluid and particulate solid after travelling through the apparatus emerges from the space between the splayed edges of the bottom plate. Between this bottom plate and the one above a plurality of vertical partitions 7, 8, 9, 10 are located near the outlet. The partitions are preferably staggered as shown, the outer partition 7 extending about ¼ to ½ turn and the length of the other partitions becoming progressively less towards the axial zone.

A fluid and sand mixture containing 10% by volume solids could be pumped through an apparatus by the type illustrated at a rate of up to about 15,000 gallons per hour, the sand issuing through the compartments, formed by the partitions 7, 8, 9, 10 showing good sub-division into size. The fines issue from the inner compartment formed by partition 10 and plug 4 whilst the coarsest particles emerge from the compartment formed by partition 7 and the rubber wall 2. Generally at lower speed or at lower volume throughput there is a tendency for better differentiation between the materials issuing from the outer compartments than there is between the materials issuing from the inner compartments i.e. there is good classification of the coarser particles but the fines become contaminated to some extent with particles issuing from the adjacent compartment. At higher speed or higher volume throughput the reverse effect is obtained.

Of course if the dimensions and volume throughput are correctly correlated good sub-division throughout the range is obtained. Depending on the purpose for which the apparatus is to be employed a relationship between the dimensions, particularly the plate radius, and speed or volume throughput for optimum working can readily be determined experimentally.

What I claim is:

1. Apparatus for separating and classifying into fractions a particulate solid aggregate which is pumped under pressure together with a fluid through the apparatus, said apparatus comprising a launder in the form of a tightly helically wound completely enclosed tube of flattened rectangular cross section, said cross section having a high length to width ratio, the axis of the helix being vertical, said tube having a tangential inlet at one end of the tube, the other end of said tube having a plurality of parallel vertical partitions therein extending in the direction of the length of the tube and dividing the end of the tube into a plurality of outlets, the partition closest to the outer periphery curving from the said other end of the tube back along the tube parallel to the axis of the tube for one distance, and successive partitions positioned inwardly of said last mentioned partition curving back along the tube for distances which are successively less than the distance the said last mentioned partition extends.

2. Apparatus as claimed in claim 1, in which each turn of the tube is integral with the turns adjacent thereto.

References Cited in the file of this patent

UNITED STATES PATENTS

| | | |
|---|---|---|
| 629,596 | Pardee | July 25, 1899 |
| 2,343,682 | McCurdy | Mar. 7, 1944 |
| 2,364,799 | Laughlin | Dec. 12, 1944 |
| 2,615,572 | Hodge | Oct. 28, 1952 |